UNITED STATES PATENT OFFICE.

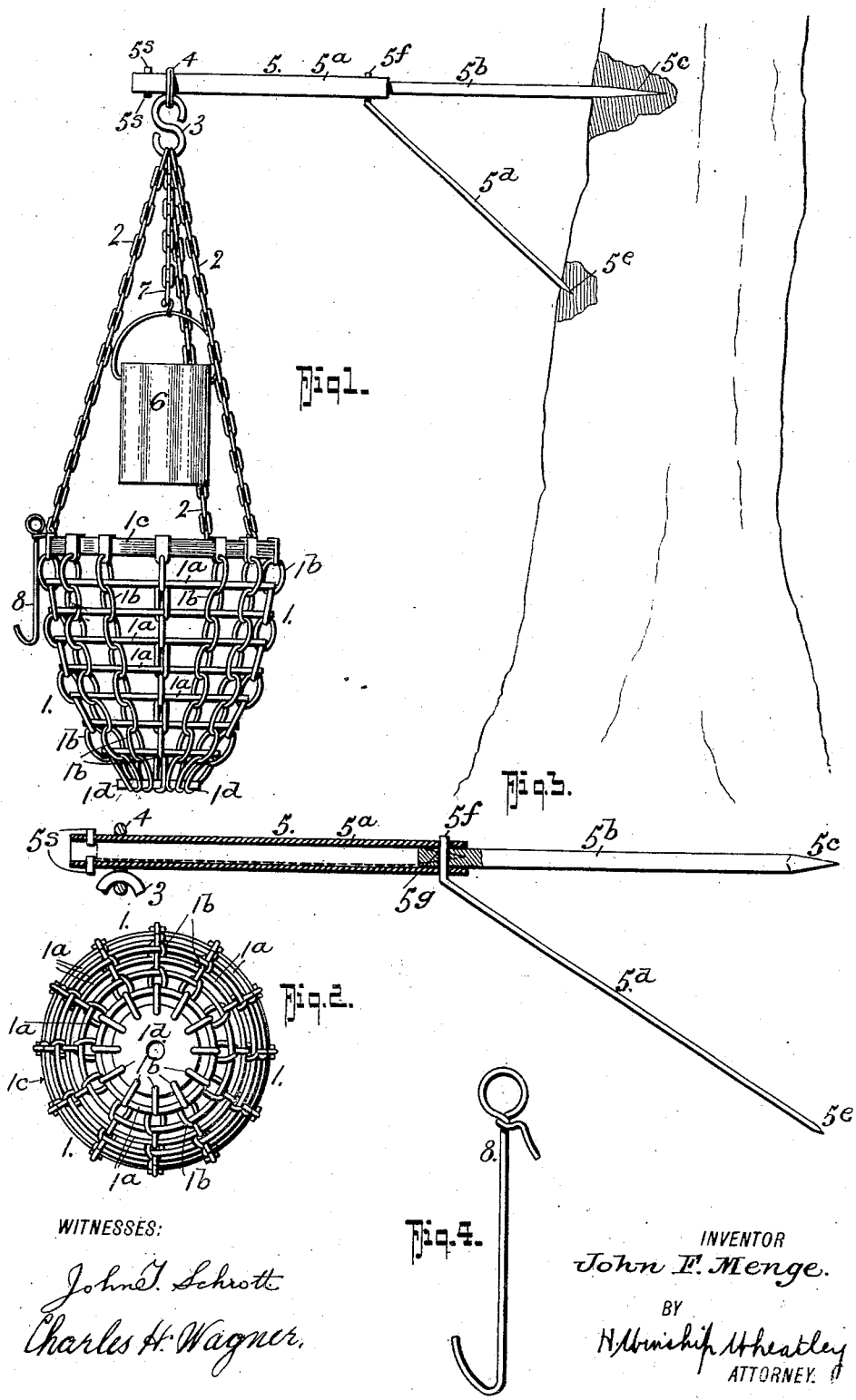

JOHN F. MENGE, OF FORT MYERS, FLORIDA.

CAMPER'S TORCH.

No. 918,070.　　　Specification of Letters Patent.　　Patented April 13, 1909.

Application filed December 10, 1908. Serial No. 466,807.

*To all whom it may concern:*

Be it known that I, JOHN F. MENGE, residing at Fort Myers, in the county of Lee and State of Florida, have invented certain new and useful Improvements in Campers' Torches, of which the following is a specification.

My invention primarily has for its object to provide a convenient and useful method for lighting a camp and also for furnishing heat and fire for cooking and other purposes.

Generically my invention comprises a basket formed of spaced hoops held together in semi-ovular form, by chain wires and suspended from a bracket that may be driven into a tree or other convenient support.

A pot for cooking purposes may be suspended from the same bracket over the basket in which victuals may be cooked.
More specifically my invention resides in those novel details of construction, combination and arrangement of parts all of which will be first described in detail, and then be specifically pointed out in the appended claims, reference being had to the accompanying drawings, in which:—

Figure 1 is a side elevation showing the application of my invention. Fig. 2 is an inverted view of the basket. Fig. 3 is a central section of the bracket showing how it may be telescoped for transportation. Fig. 4 is a view of a hook used to steady the basket when it is put up for use.

Referring now to the accompanying drawings, in which like letters and numerals of reference indicate like parts in all of the figures 1 represents the basket which consists of a series of hoops or rings $1^a$ joined together by flexible connections, such as chains $1^b$, the ends of which are secured to a rim hoop $1^c$ and a bottom plate $1^d$, as shown.

Three or more hanging chains 2 are secured to the rim hook $1^c$ and to an S-shape hook 3 to furnish a suspending medium for the basket.

The hook 3 is secured to a bracket 5 by a ring 4, through which the outer telescopic section $5^a$ of the bracket 5 passes. Stops $5^s$ are provided to prevent the ring coming off the bracket when the torch is in use.

The bracket 5 comprises an outer tubular member $5^a$ and a wire rod $5^b$ that telescopes in the portion $5^a$ and has a pointed end $5^c$ to enter a support, such as a tree or the like.
A brace $5^d$ having a corresponding pointed end $5^e$ that is adapted to be forced into the support has an end $5^f$ bent to enter alining apertures $5^g$ in the rod $5^b$ and tubular member $5^a$ to hold the telescopic members $5^a$—$5^b$ in the position shown in Fig. 1.

A bucket 6 may be suspended from the hook 3 by a chain 7 and held over the fuel basket 1.

A wire hook 8 may be used to steady the fuel basket when it is first placed in position on the bracket.

In the practical application of my invention the basket 1 is filled, or partly filled with wood or other fuel, which when ignited, furnishes light and heat so that the torch may be used to light up the camp, or as a cooking medium for the material within the bucket 6, or both if desired.

By providing a torch of this character ample draft for the fuel will be obtained and at the same time the lighting effect of the ignited fuel will be conserved so that the food for the camp may be cooked and simultaneously the camp may be illuminated.
From the foregoing description, taken in connection with the accompanying drawings, it is thought the complete construction, operation and numerous advantages of my invention will be readily understood by those skilled in the art to which the invention appertains.

What I claim is:—

1. A camper's torch comprising a basket formed of a series of parallel hoops or rings and flexible connections there-between, together with means for supporting the basket.

2. A device of the class described comprising a basket formed of a series of hoops, and chains connecting said hoops together, said hoops being of gradually increasing diameter from the bottom to the top of the basket, a bracket, chains suspending the basket from the bracket, substantially as shown and described.
3. A device of the class described comprising a basket formed of a series of hoops, and chains connecting said hoops together, said hoops being of gradually increasing diameter from the bottom to the top of the basket, a bracket, chains suspending the basket from the bracket, and a bucket suspended from the bracket over the basket.

4. In a camper's torch outfit, a flexible basket, a bracket and means for hanging the basket from the bracket, combined with a bucket also hung from the bracket over the basket.

5. In a camper's torch outfit, a flexible basket, a bracket, means for hanging the basket from the bracket, combined with a bucket also hung from the bracket over the basket, said bracket comprising a tubular member and a pointed member telescoped within the tubular member, and a pointed rod having a portion to project through alining apertures in the telescopic members to hold the telescopic members in their extended position.

JOHN F. MENGE.

Witnesses:
FRANK C. ALDERMAN,
W. R. WASHBURN.